United States Patent [19]

Stephens et al.

[11] Patent Number: 4,856,812
[45] Date of Patent: Aug. 15, 1989

[54] AXLE SUSPENSION SYSTEM
[75] Inventors: Donald L. Stephens, Skagit County; James Saunders, Burlington, both of Wash.
[73] Assignee: Paccar Inc., Bellevue, Wash.
[21] Appl. No.: 175,747
[22] Filed: Mar. 31, 1988
[51] Int. Cl.$^4$ ............................................. B60G 5/00
[52] U.S. Cl. .................................. 280/678; 280/711; 280/713
[58] Field of Search ............... 280/678, 711, 713, 680, 280/679, 681, 677, 683

[56] References Cited

U.S. PATENT DOCUMENTS

| | | | |
|---|---|---|---|
| 776,513 | 12/1904 | Hill | 267/46 |
| 1,036,885 | 8/1912 | Moyer | 267/46 |
| 1,258,355 | 3/1918 | Mullen et al. | 267/31 |
| 1,273,813 | 7/1918 | Bernat | 267/31 |
| 1,410,231 | 3/1922 | Ward | 267/271 |
| 1,423,255 | 7/1922 | Rath | 384/396 |
| 1,426,406 | 8/1922 | Parcher | 267/268 |
| 1,442,713 | 1/1923 | DuFord | 267/240 |
| 1,443,617 | 1/1923 | Chambers | 267/233 |
| 1,448,234 | 3/1923 | Luce | 267/234 |
| 1,480,633 | 1/1924 | Pettegrew | 267/52 |
| 1,534,424 | 12/1921 | Stark et al. | 267/239 |
| 1,715,034 | 5/1929 | Hoover | 267/46 |
| 1,747,725 | 2/1930 | Monteith | 267/45 |
| 1,782,113 | 11/1930 | Albersheim et al. | 267/46 |
| 1,839,189 | 12/1931 | Barbarino | 267/263 |
| 1,861,470 | 6/1932 | Fisher | 267/262 |
| 1,882,024 | 10/1932 | Menger | 267/236 |
| 2,003,823 | 6/1935 | Bucklen et al. | 188/279 |
| 2,237,056 | 5/1941 | Manning | 267/273 |
| 2,245,201 | 6/1941 | Kjolseth | 267/260 |
| 2,559,103 | 7/1951 | Anderson | 267/44 |
| 2,711,314 | 6/1955 | Roehrig | 267/242 |
| 2,864,453 | 12/1958 | La Belle | 180/24.02 |
| 2,952,455 | 9/1960 | Neuville et al. | 267/30 |
| 2,998,261 | 8/1961 | Bartlett | 280/711 |
| 3,022,087 | 2/1962 | Black | 280/682 |
| 3,031,179 | 4/1962 | Peirce | 267/31 |
| 3,063,703 | 11/1962 | Harbers et al. | 267/64.19 |
| 3,063,732 | 11/1962 | Harbers et al. | 280/712 |
| 3,080,161 | 3/1963 | Felburn | 267/229 |
| 3,194,580 | 7/1965 | Hamlet | 280/682 |
| 3,201,141 | 8/1965 | Bernstein et al. | 280/683 |
| 3,202,235 | 8/1965 | Warner | 180/73.3 |
| 3,231,258 | 1/1966 | Brownyer et al. | 267/31 |
| 3,294,390 | 12/1966 | Warmkessel | 267/31 |
| 3,494,608 | 2/1970 | McGee | 267/31 |
| 3,499,662 | 3/1970 | Paul | 280/712 |
| 3,730,550 | 5/1973 | Thaxton | 280/712 |
| 3,782,753 | 1/1974 | Sweet et al. | 280/712 |
| 3,861,708 | 1/1975 | Fier | 280/712 |
| 3,866,894 | 2/1975 | Sweet et al. | 267/31 |
| 3,970,293 | 7/1976 | Sweet et al. | 267/31 |
| 4,003,562 | 1/1977 | Kaiser et al. | 267/268 |
| 4,033,608 | 7/1977 | Sweet et al. | 280/711 |
| 4,046,395 | 9/1977 | Smith, III | 280/790 |
| 4,099,741 | 7/1978 | Sweet et al. | 280/712 |
| 4,397,478 | 8/1983 | Jensen et al. | 280/711 |
| 4,625,994 | 12/1986 | Tanaka et al. | 280/711 |

FOREIGN PATENT DOCUMENTS 722077 11/1965 Canada .
1925263 11/1970 Fed. Rep. of Germany .
568677 11/1957 Italy .
255729 1/1926 United Kingdom .

OTHER PUBLICATIONS

"Front Air Suspension", Chief Engineers' meeting 1981.

Primary Examiner—Kenneth R. Rice
Attorney, Agent, or Firm—Seed and Berry

[57] ABSTRACT

A front axle suspension for a vehicle that is soft in ride and stiff in roll is provided. The front axle is coupled to a solid beam. The beam is a relatively nonflexible member. The beam is pivotally coupled at one end thereof to the frame and is freely movable at the other end thereof, being coupled to said frame through a two-shackle coupling that permits vertical displacement and prevents horizontal displacement. Two air bags are coupled between said beam and said frame. The two air bags carry substantially all the weight of the vehicle over the front axle. The two bags are designed to provide a very soft ride. The two bags are positioned longitudinally along the beam such that one of the air bags is displaced a greater distance than the other from the pivotal connection of the beam to the frame. An air line couples the two air bags to each other to permit air to flow from one air bag to the other during movement of the front axle with respect to the frame. An orifice restricts the flow of air between the bags to ensure that damping occurs at a selected frequency, such as the system natural frequency.

32 Claims, 2 Drawing Sheets

U.S. Patent  Aug. 15, 1989  Sheet 1 of 2  4,856,812
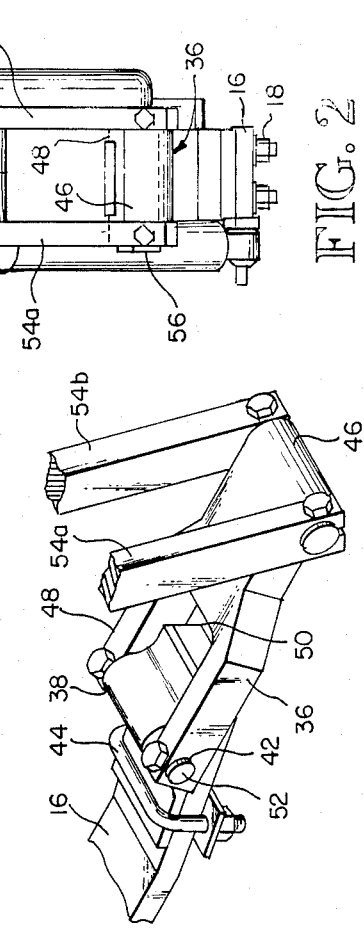
FIG. 1
FIG. 2
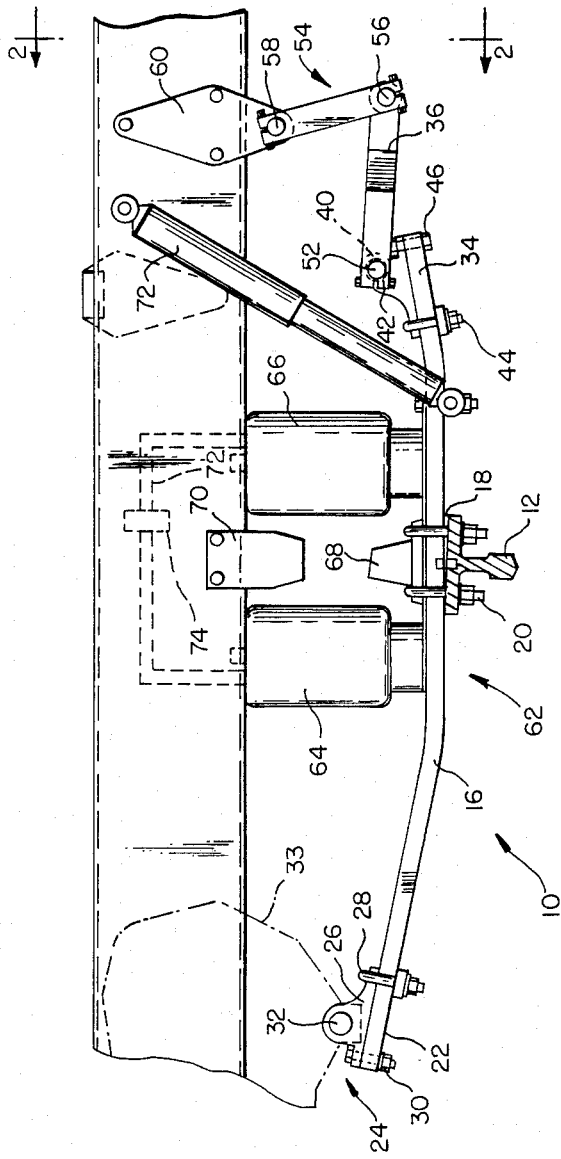
FIG. 3

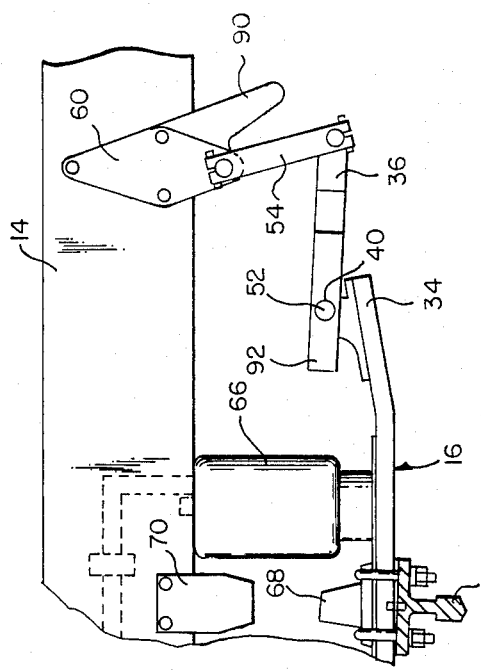
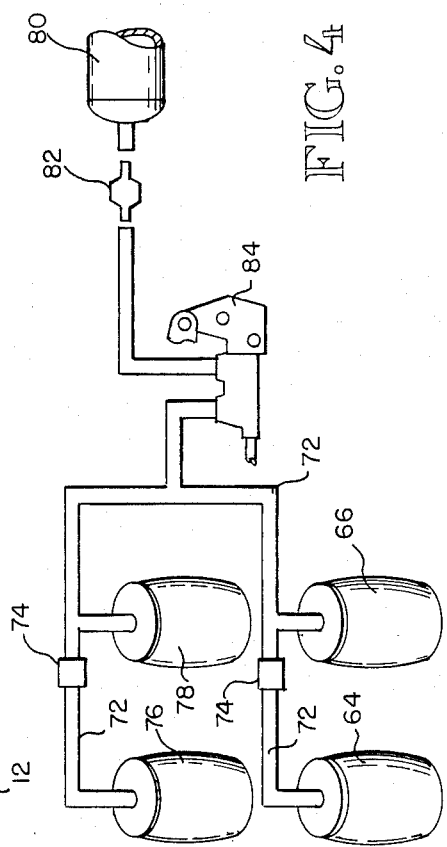

AXLE SUSPENSION SYSTEM

TECHNICAL FIELD

This invention relates to an axle suspension system, and more particularly, to a suspension system having air bags coupled to a beam between the frame and the axle to provide a soft ride and a large stiffness in the roll.

BACKGROUND OF THE INVENTION

The driver of a vehicle prefers to drive a vehicle which has a soft ride. The driver also prefers a vehicle that is stiff in roll. The vehicle may encounter road conditions, such as bumps, that a soft ride in the suspension will accommodate, but since the vehicle is also required to turn, stiffness in the roll of a vehicle is needed. Trucks are particularly sensitive to the stiffness in the roll.

In the past, a variety of suspension systems have been interposed between the wheels and the frame of the vehicle to improve the ride. One suspension system uses leaf springs. In this type of suspension, the leaf springs, usually a plurality of leaves arranged in a stack, cannot provide both a soft ride and large roll stiffness.

One method of providing a soft ride has been to place an air bag between the axle and the frame to absorb some of the bumps. A disadvantage of using air bags is that they are very flexible in the horizontal dimension and they are very soft, that is, they have a low spring rate, which makes the vehicle soft in roll.

SUMMARY OF THE INVENTION

It is therefore an object of this invention to provide a suspension system for a vehicle that is soft in ride and stiff in roll.

It is an object of this invention that the ride and roll characteristics of the vehicle can be varied independently of each other.

It is an object of this invention to provide a suspension system that provides damping at selected frequencies.

It is a further object of this invention to provide a suspension system having a beam member pivotally coupled to the frame at one end only and having two air bags coupling the beam member to the frame, one of the air bags being spaced further from the pivotal coupling than the other air bag.

It is a further object of this invention to provide a suspension system having a member coupled to the axle and the frame that pivots at one end and is freely movable at the other end to permit vertical displacement without any horizontal displacement at the other end of the member.

These and other objects of the invention are accomplished by providing a vehicle suspension system having a member or beam directly coupled to an axle. One end of the member is pivotally coupled to the frame, and the other end is coupled to the frame in such a way as to permit vertical displacement but not horizontal displacement at this end of the member. Two air bags are mounted on the member, one on either side of the axle. One air bag is mounted farther from the pivot point than the other air bag. When the axle and frame move up and down with respect to each other, the air bag farther from the pivot point has a greater displacement than the air bag closer to the pivot point. Air lines couple the interior of the air bags to each other to permit air to flow between the bags. A restriction is placed in the line to restrict the flow of air between the air bags to provide damping. The amount of restriction is selected to provide damping at a selected frequency, such as the natural frequency of the system.

The beam is pivotally coupled to the frame at a first end using any well-known pivotal coupling. The beam is coupled to the frame at a second end using two shackles. The two shackles restrict side movement of the beam but permit full freedom of movement in the vertical and fore-aft horizontal direction. This is accomplished by providing a first shackle pivotally coupled to the second end of the beam. A second shackle is pivotally coupled to the first shackle and to the frame. The second shackle is also coupled to the frame at a point well behind the second end of the beam. The first shackle therefore extends horizontally beyond the second end of the beam. This acts to extend the effective length of the beam. The first and second shackles are sufficiently long that full vertical motion by the beam is permitted. The first shackle extends behind the beam to ensure freedom of vertical movement through the entire expected range.

In a preferred embodiment, the beam coupled between the axle and the frame is a single beam that is relatively inflexible. This type of beam provides stiffness against roll for the vehicle in a turn. The beam is mounted to be substantially non-weight-bearing at each end. The air bags transfer substantially all the weight of the vehicle from the frame to the axle. This provides long life of the beam and suspension parts.

In one embodiment, the first shackle has an arm that acts as a safety stop to prevent the beam from exceeding a predetermined vertical displacement from the frame. A safety stop is provided behind the second shackle to prevent the beam from exceeding a predetermined horizontal displacement.

BRIEF DESCRIPTION OF THE DRAWINGS

FIG. 1 is side elevation of the vehicle suspension system.

FIG. 2 is an end view of the suspension as viewed in the direction of the arrows 2—2 in FIG. 1.

FIG. 3 is a fragmentary isometric view of the two-shackle assembly.

FIG. 4 is diagram of the air bags and air line connections.

FIG. 5 is a side elevation of an alternative embodiment of the suspension having safety stops.

DETAILED DESCRIPTION OF THE INVENTION

A vehicle suspension system, labeled generally as 10, is shown in FIG. 1. The suspension system includes an axle 12 and a frame 14 of the vehicle. The axle 12 is shown as a front axle; however, the teachings with respect to the suspension system could be used to mount the frame on any axle. A beam or member 16 is directly coupled to the axle through appropriate couplings, such as U-bolts 18 and 20. The member 16 is, in the preferred embodiment, a single beam of relatively rigid and inflexible steel. Alternatively, the member 16 is a leaf spring or a plurality of leaf springs. However, certain advantages are achieved by using a single rigid beam that is designed to be stiff and unbending under load, if compared to a spring member.

The beam 16 is pivotally coupled at a first end 22 to the frame 14, using any suitable pivotal coupling 24 known in the industry, to provide pivoting characteristics of the beam at this point. A suitable coupling is an eye assembly 26 attached to the beam 16 through bolts 28 and 20 to hold a pivot post about 32 secured to the frame 14 by plates 33. The beam 16 extends lengthwise towards the rear of the vehicle. The beam is coupled at its rear or second end 34 to permit freedom of movement, as described herein.

The beam 16 includes a main body portion 62. The axle 12 is coupled to the beam at the main body portion. Two conventional air bags 64 and 66 are coupled to the beam at the main body portion. A pair of safety stops 68 and 70 are provided on the beam and the frame, respectively, to limit movement of the beam. A shock absorber 71 may also be coupled between the beam and the frame, if desired.

The two air bags are each placed the appropriate distance on either side of the axle. For air bags of the same dimensions and qualities, they are generally equidistant from the axle. The relative distance from the axle may be varied, however, depending on the size of each air bag, system requirements, etc.

An air line 72 couples the interior of air bag 64 to the interior of air bag 66. The air line includes a restriction or orifice 74 between the air bags 64 and 66. The air line 72 also couples the air bags to an air supply 80, as shown in FIG. 4. A pair of air bags 76 and 78 for the opposite side of the vehicle are also coupled together through a restriction 74 and to the same air supply 80 through the air line 72. A suitable protection valve 82 is coupled between the air supply 80 and bags. A conventional leveling valve 84 is provided between the air supply 80 and the bags, as is known in the industry.

The restriction 74 between the air bags is an orifice having a selected diameter less than the internal diameter of the air line 72. The size of the orifice is selected to control the velocity of the airflow between the two air bags.

The air bags are designed such that they will provide a soft ride. The air bags are designed to have a low spring rate, which in turn provides a low natural frequency of the sprung mass. This aids to provide a soft ride. The air bag spring rate is made relatively low compared to the air bag spring rate permitted in air bags on other suspension systems. A potential problem that occurs when using air bags having a low natural frequency is that the vehicle may encounter road conditions that coincide with the natural frequency of the system. If the system begins to move at the system natural frequency, the bumps are amplified instead of being damped. In the event the bumps are amplified, the ride becomes uncomfortable.

The particular air bag arrangement of this invention soles the problem of amplifying a vibration occurring at the natural frequency of the system in the following way. Two air bags are provided for each beam attached to the axle. One air bag 64 is closer to the axis of the pivot post 32 than the other air bag 66. The beam thus forms a lever arm such that air bag 64 is always displaced less than the air bag 66. The result is that the bag 66 will force air into bag 64 through the orifice 74, providing damping of the bag 64.

By correctly selecting the diameter of the orifice 74, either by the selection of the orifice or by providing a variable size orifice, the damping, which is frequency sensitive or tunable, can be adjusted to the frequency desired. Usually, the damping is desired to match the system natural frequency. Even if conventional damping is needed, such as by a shock absorber, it can usually be set to be less in value, again providing improved isolation. The proper size of the restriction to provide damping at the system natural frequency depends on many factors, including the size of the air bags, the length of the beam 16, the weight of the vehicle, etc.

The use of a rigid beam for member 16 provides significant advantages. The rigid beam flexes relatively little in the main body portion between the axle connection and the air bag connection. Substantially all of the weight of the frame is transferred through the air bags to the axle. The air bags become the primary spring rather than the beam 16. The beam can therefore be designed to be rigid and unbending compared to a plurality of leaf spring members. A single beam of strong steel may be used. This is also much thinner than a plurality of leaf springs. The thinner beam permits use of longer air bags, which allow for lower spring rates.

An important advantage to a rigid beam is the stiffness provided in roll. The beam has a much greater stiffness, both in bending and in torsion, than a leaf spring member. The rigid beam provides the needed stiffness in roll. The air bags provide the desired soft ride. Thus the combination of one or more air bags and a single rigid beam provide the synergistic result of an air suspension that is both soft in ride and stiff in roll.

The present invention uses an air bag system that effectively isolates the spring properties from the rest of the system. The beam member is made very stiff in the roll and coupled rigidly in torsion or twisting to the frame to resist roll. The air bags can now be designed to provide the optimum softness in the ride. That is, the beam is designed to provide the optimum stiffness in roll without being concerned about the softness of the ride. In this way, the system can be designed to have both optimum ride and roll characteristics independent of each other.

Beam 16 is coupled at a second end 34 to the frame through a two-shackle coupling. The first shackle 36 is pivotally coupled to the second end 34 of the beam using a suitable coupling assembly, such as a spring eye 38 (FIG. 3), a bushing 40 and a pin 42 having a pivotal axis 52. The spring eye is attached to the beam using suitable U-bolts 44 and 46.

The first shackle 36, attached at end 34 of beam 16, is fork-shaped, having a body portion 46 and a forked portion 48. An open space 50 of sufficient size is provided immediately behind the beam to permit the beam complete freedom of pivotal movement about pivotal axis 52. A first shackle member 16 made of two separate links would also be suitable to provide a space for pivoting; however, a single-piece forked shackle is preferred. Full pivoting motion must be provided at both ends of the shackle 36.

A second shackle 54 is pivotally coupled through a pin 56 to the first shackle 36. The second shackle 54 is pivotally coupled through a pin 58 to the frame 14 by attachment to rigid frame plates 60. The second shackle 54 is a two-piece member, including links 54a and 54b in the preferred embodiment, but could be other suitable shapes that permit full pivoting motion at both ends of shackle 54.

The two-shackle coupling provides the advantage of permitting the second end of the beam 16 to move up and down, in the vertical direction, with no side-to-side horizontal movement. The air bags provide proper springing of this vertical motion. The pivotal motion of the free end of the beam will also result in limited forward and rearward motion in the horizontal direction. The shackle coupling resists both twisting and side-to-side movement of the beam and thus provides stiffness in roll.

An understanding of the increased torsional resistance of the beam and thus increased roll stiffness in the vehicle is best shown by comparing the stiffness in torsion of the beam 16 and the stiffness in torsion of a leaf spring. In a leaf spring suspension, only the forward and rearwardmost ends of one spring leaf are connected to the frame. Therefore, torsional resistance is primarily determined by the torsional resistance of this single leaf rather than all leaves combined.

A single typical leaf of a leaf spring suspension is one-half inch thick (vertical thickness) and four inches wide (horizontal width). One embodiment of a beam of this invention is, by comparison, one and one-fourth inch thick (vertical thickness) and four inches wide (horizontal width).

Torsional deflection is:

$$\theta = TL/KG$$

where
T = torsion (inch-pound)
L = length of shaft or bar (inch)
G = modulus of stiffness of material (lb/in$^2$)
K = section torsional stiffness Stiffness in torsion for a rectangular section where width = W and thickness = T is:

$$K = \frac{WT^3}{16} \left[ \frac{16}{3} - 3.36 \frac{T}{W} \left( 1 - \frac{T^4}{12W^4} \right) \right]$$

Using this formula, it can be shown for the above dimensions that the beam 16 has a torsional stiffness of 2.02 and the single leaf spring has a torsional stiffness of 0.1535.

The first shackle 36 extends substantially parallel to the main body of the beam 16. The first shackle is thus a long link that acts as an extension of the beam. The beam can be cut short to allow a lighter weight beam to be used. This permits the beam to be cut short, immediately after the main body portion, and the shackle 36 to be extended to permit full freedom of motion in the vertical dimension of the end of the beam. This ensures that the loading is through the air bags rather than through the pivots.

Improved roll stability is obtained by minimizing the total length, including shackles, from the axle to the frame. By cutting the beam short, directly behind the main body portion, the overall length from the axle to the frame is decreased, providing enhanced roll stability.

The second shackle, plus the length of the bracket 60, have a length equal to or greater than the distance between the second end 34 of the beam 16 and the frame 14. This ensures that the first shackle is generally parallel to the frame 14. This permits better freedom of motion of the beam 16 so that the relative motion of the axle with respect to the frame can be absorbed by the air bags, which have a very low spring rate.

An alternative embodiment of the suspension is illustrated in FIG. 5. If the beam should break forward of the axle, the axle would move rearwardly as the brakes were applied. Rearward movement of the beam is resisted by the beam on the opposite end of the axle on the opposite side of the vehicle, and unlimited movement is precluded when the shackle 54 hits the stop 90.

The shackle 36 is also provided with an extension 92 that extends forward from the pivot axis, 52. The extension limits the downward movement of the free end 34 of the beam. The stop 90 and extension 92 will not act to restrict the free movement of the beam under normal operating conditions but will restrict the movement of the beam in the event failure of some part of the beam occurs or extremely hazardous road conditions are encountered.

We claim:

1. A suspension system for a vehicle, comprising:
   an axle;
   a single rigid beam coupled to said axle, said beam being pivotally coupled at a first end to a frame of said vehicle and coupled at a second end to said frame, said coupling at said second end permitting free vertical displacement of said second end but precluding twisting or side-to-side movement; and
   at least one air bag coupled to said beam and to said frame.

2. The suspension system of claim 1, further including a second air bag coupled to said beam and to said frame, said first air bag being positioned closer to said first end of said beam than said second air bag.

3. The suspension system of claim 1 wherein said beam has a relatively wide width but a large vertical thickness relative to a single lead spring member and thus is stiffer in torsion than a conventional leaf spring assembly.

4. The suspension system of claim 1 wherein substantially all of the weight carried by said axle is transferred through said air bags.

5. The suspension system of claim 1 wherein said air bags are selected to provide a very soft ride and said beam is very stiff in roll.

6. The suspension system of claim 2, further including an air line coupling the first air bag to the second air bag.

7. The suspension system of claim 6, further including a restriction in said air line for restricting the flow of air between said first bag and said second bag to provide damping of said suspension system.

8. The suspension system of claim 7 wherein said restriction is sized to provide damping at the system natural frequency.

9. The suspension system of claim 6 wherein the size of said restriction is variable.

10. The suspension system of claim 1 wherein said coupling at said second end of said beam includes a first shackle pivotally coupled to said beam and a second shackle pivotally coupled at a first end to said first shackle and pivotally coupled at said second end to said frame.

11. The suspension system of claim 10 wherein said first shackle includes an extension portion extending from said pivotal coupling and overlying said second end of said beam beyond the shackle's pivotal connection to the beam, the extension acting as a safety stop to prevent the vertical distance between said beam and said frame from exceeding a predetermined amount.

12. A suspension system for a vehicle, comprising:
    an axle;
    a member coupled to said axle, said member being pivotally coupled at a first end to a frame of said vehicle and coupled at a second end to said frame, said coupling at said second end permitting vertical displacement through an arc and not horizotal displacement of said second end;
a first air bag coupled to said member and to said frame;
a second air bag coupled to said member and to said frame;
said first air bag being positioned closer to said first end of said member than said second air bag is to said first end;
an air line coupling said first air bag interior to said second air bag interior; and
a restriction in said tubing of a predetermined size for restricting the flow of air between said air bags to provide damping of said system at a selected frequency.

13. The suspension system of claim 12 wherein the size of said restriction is variable.

14. The suspension system of claim 12 wherein substantially all of the weight carried by said front axle is transferred through said air bags.

15. The suspension system of claim 12 wherein said coupling at said second end of said member includes a first shackle pivotally coupled to said beam and extending substantially parallel to said frame and a second shackle pivotally coupled at a first end to said first shackle and pivotally coupled at said second end to said frame.

16. The suspension system of claim 12 wherein said member is a single-piece, relatively rigid beam member.

17. A suspension system for a vehicle, comprising:
an axle;
a member coupled to said axle, said member being pivotally coupled at a first end to a frame of said vehicle and coupled at a second end to said frame, said coupling at said second end permitting vertical displacement and no horizontal displacement of said second end, said coupling at said second end of said member including a first shackle pivotally coupled to said member and extending substantially parallel to a main body portion of said member, and a second shackle pivotally coupled at a first end to said first shackle and pivotally coupled at said second end to said frame;
a first air bag coupled to said beam and to said frame; and
a second air bag coupled to said beam and to said frame;
said first air bag being positioned closer to said first end of said beam than said second air bag is to said first end.

18. The suspension system of claim 17 wherein said first shackle has a length approximately equal to the distance between said frame and said second end of said member.

19. The suspension system of claim 17 wherein said first shackle includes an extension extending from said second end towards said first end of said beam and overlying said beam forward of the pivotal connection of the shackle to the beam, said extension acting as a safety stop to prevent said member from exceeding a predetermined vertical displacement with respect to said frame.

20. The suspension system of claim 17, further including a safety stop positioned behind said second shackle and extending from said frame to prevent said axle from exceeding a predetermined horizontal displacement with respect to said frame.

21. The suspension system of claim 17 wherein said first shackle includes a forked region coupled to said beam on either side thereof and having an open region permitting said beam to enter said open region and having a main body region more narrow than said forked region, said second shackle being coupled to said first shackle at said body region.

22. The suspension system of claim 17 wherein said member is a single-piece, relatively rigid beam member.

23. The suspension system of claim 17, further including:
an air line coupling the interior of said first air bag to the interior of said second air bag; and
a restriction of a predetermined size in said air line for restricting the flow of air between said first bag and said second bag to provide damping.

24. The suspension system of claim 23 wherein the size of said restriction is variable.

25. The suspension system of claim 24 wherein said beam is a relatively rigid member having a large vertical dimension relative to a leaf spring member and is stiffer in twisting and bending than a leaf spring member.

26. The suspension system of claim 17 wherein substantially all of the weight carried by said axle is transferred through said air bags.

27. The method of providing a vehicle with a front axle suspension that is relatively soft in ride and relatively stiff in roll, comprising:
coupling said front axle to a single rigid beam;
pivotally coupling said beam at a first end thereof to said frame with a non-weight-bearing coupling;
coupling said beam at a second end thereof to said frame with a coupling that is non-weight-bearing;
coupling a plurality of air bags to said beam and said frame;
transferring substantially all of the weight of said vehicle to said front axle through said air bags to provide a softness in ride; and
restricting roll of said front axle by resisting twisting of said beam member to provide stiffness in roll.
restricting roll of said front axle by resisting twisting of said beam member to provide stiffness in roll.

28. A suspension system for a vehicle; comprising:
a frame;
an axle having wheels attached thereto;
a rigid beam coupled to said axle and to said frame, said beam having a first end portion, a second end portion and a body portion between said first end portion and said second end portion, said first end portion being spaced from said body portion;
a pivot extending through said beam and coupled to said frame at said first end of said beam to pivotally couple said beam to said frame at said first end portion and prevent said beam from moving vertically up or down with respect to said frame;
an air bag coupled to said beam and said frame at said body portion; and
a shackle means coupled to said second end portion and said frame for permitting free vertical displacement of said second end but precluding twisting or side-to-side movement, the roll characteristics of said vehicle being primarily determined by the properties of the rigid beam and the ride characteristics of said vehicle being primarily determined by the properties of said air bag.

29. The suspension system according to claim 28 wherein said air bag is coupled to said beam between said first end portion and said axle.

30. The suspension system according to claim 29, further including a second air bag coupled to said beam between said second end portion and said axle, said second air bag being positioned further from said pivot than said first air bag, causing said second air bag to undergo greater pressure changes than said air bag undergoes when said axle experiences simple up/down vertical displacement with respect to said frame; and a coupling between the interiors of said first air bag and said second air bag permitting air to flow from one air bag to the other.

31. The suspension system of claim 7, further including a source of fluid pressure coupled to said second air bag in series through said restriction and said first air bag, respectively.

32. The suspension system according to claim 23, further including a source of fluid pressure coupled to said second air bag in series through said restriction and said first air bag, respectively.

* * * * *